United States Patent Office
3,361,518
Patented Jan. 2, 1968

3,361,518
METHOD OF PREPARING HETEROPOLY ACIDS
Vincent Chiola and Clarence D. Vanderpool, Towanda, Pa., assignors to Sylvania Electric Products Inc., a corporation of Delaware
No Drawing. Filed Feb. 24, 1965, Ser. No. 435,070
4 Claims. (Cl. 23—23)

ABSTRACT OF THE DISCLOSURE

Heteropolytungstic acids are prepared by reacting in aqueous medium a water-soluble compound containing a tungstate radical and a water-soluble compound containing a heteroatom, a mineral acid being added to the solution to promote the reaction. It has been found that the presence of the mineral acid anion in the solution causes instability of the heterotungstic acid when it is recovered by crystallization from the solution. This instability is overcome by passing the solution first in contact with a cation exchange resin and then in contact with a weakly basic anion exchange resin preliminary to recovery of the heterotungstic acid therefrom.

---

This invention relates to a method for preparing heteropoly acids and more particularly to an improved method for preparing heteropoly acids containing tungsten and any of the large number of elements (heteroatoms) which are capable of being combined with polyhedral, condensed tungstate anions. Examples of the elements affording the heteroatoms contemplated by the present invention are phosphorus, silicon, aluminum, boron, vanadium, arsenic, titanium, iron, nickel, cobalt and niobium.

Various methods have been employed for preparing heteropolytungstic acids. In general, at one stage of these processes a mineral acid such as, for example, hydrochloric acid, must be added to an aqueous solution of the principal reactants to reduce the pH of the solution to a value at which the association of the heteroatom with the tungsten atoms to form the heteropolytungstate compound can take place. It now has been appreciated that the presence of residual mineral acids in the heteropoly tungstic acids produced by these earlier methods causes instability of the desired heteropoly acids. This instability is manifested, for example, by the precipitation of foreign solids during evaporation of intermediate aqueous solutions for the purpose of obtaining the heteropoly acids in crystalline form. In addition when the crystalline heteropoly acids are dissolved in water, the resulting solutions frequently are hazy, or substantial quantities of insoluble materials appear.

One method of making alkali-free heteropolytungstic acids has been to acidify a solution containing sodium tungstate and a sodium salt containing a heteroatom. The heteropolytungstic acid then was separated from the salt solution by ether extraction and was recovered by evaporation of the ether or by breaking down the ether-acid complex by heating with water or dilute hydrochloric acid.

In another procedure which is described and claimed in U.S. Patent No. 3,288,562 of John M. Laferty, Jr., assigned to the assignee of the present application, a solution of sodium tungstate is acidified with hydrochloric acid sufficiently to produce sodium metatungstate in the solution. Phosphoric acid then is added to the solution to supply phosphorous for combination in the heteroatom position of the desired phosphotungstate. The solution next is passed in contact with a cation exchange resin on the hydrogen cycle to remove the sodium ion. The phosphotungstic acid crystallized from the solution has a desirably low sodium content. However, it has been found that a cloudiness frequently develops in the solution during the crystallization, causing contamination of the crystals with decomposition products of the phosphotungstic acid. In addition, the crystals produced tend to afford cloudy solutions upon being dissolved in water. These problems to a degree are reduced or overcome by repeated recrystallization of the product. However, as can be readily understood, this further purification procedure is time-consuming and expensive, and causes a reduction in the yield of the product.

It is, therefore, an object of the invention to provide a method of preparing heteropolytungstic acids of improved purity.

It is a further object of the invention to provide a method of preparing heteropolytungstic acids which involves a treatment of the aqueous solution in which they are formed so as to permit crystallization of the acids in a highly pure condition directly from the solution.

It is a still further object of the invention to provide a method for producing crystalline heteropolytungstic acids which is capable of dissolving completely in water without the appearance of insoluble impurities in the solution.

In carrying out the method of the present invention, an important step is the substantial reduction or removal of mineral acid anions from an aqueous solution of the desired heteropolytungstic acid by contacting the solution with a basic ion-exchange resin. Various of the known anion exchange resins may be employed for this purpose. As a typical example, a weakly basic anion exchange resin comprised of polyalkylamine functional groups attached to a styrene-divinylbenzene matrix and sold as Dowex-3 by Dow Chemical Company of Midland, Mich. is particularly effective. The aqueous solution may have been previously obtained by any of the various procedures as will be evident from the following further explanation and examples illustrating the method of the invention. The mineral acid ions so removed are present in the solution as a result of the addition of a mineral acid previously in the series of steps employed in the process to reduce the pH of a solution containing a soluble compound of the heteroatom and a soluble compound containing the tungstate radical. As previously mentioned in this specification, the reaction between these compounds is best carried out at pH values in the acid range, thus necessitating the addition of a mineral acid such as hydrochloric acid.

In order that those skilled in the art better may comprehend the process herein described and claimed, illustrative examples of the process are set forth below.

Example I

A solution of sodium tungstate was prepared by dissolving 396 grams of $Na_2WO_4 \cdot 2H_2O$ crystals in 3000 ml. of water and 36.2 grams of vanadium oxide, $V_2O_5$, was added to the solution. The vanadium oxide was in excess of the amount required and did not dissolve completely. The solution then was acidified to a pH of about 0.6 by a slow addition of about 200 ml. of reagent grade hydrochloric acid (37% HCl) while heating the solution to a temperature of about 95° C. After being filtered and cooled to about room temperature, the solution was extracted with a mixture of diethyl ether to form an ether-tungstovanadic acid complex in ether solution. Decomposition of the ether-acid complex and transfer of the acid to aqueous solution were accomplished by heating 125 ml. of the complex with 250 ml. of water on a steam bath. The evaporation which occurred on the steam bath resulted in some precipitation of the solids in the solution. This was removed by filtering.

Using a portion of the filtrate produced as described in the preceding paragraph, several attempts were made to obtain crystals of tungstovanadic acid by evaporation of the solution. However, in each case decomposition occurred during evaporation, resulting in a product which was not capable of being completely redissolved in water.

A second portion of the above-mentioned filtrate was passed through a column filled with a weakly basic anion exchange resin, Dowex-3, on the OH cycle. The effluent from the column gave a negative test for chloride ion with silver nitrate solution. Crystalline material obtained by evaporation of the solution after passage through the column were readily soluble in water to afford a clear acidic solution, and gave an X-ray diffraction pattern indicating the material to be tungstovanadic acid.

*Example II*

A solution of sodium tungstate was prepared by dissolving 340 grams of $Na_2WO_4 \cdot 2H_2O$ crystals in 650 ml. of deionized water. A sodium silicate solution prepared by dissolving 10 grams of silica gel in 25 ml. of 25% NaOH solution then was added to the sodium tungstate solution and the mixture of solutions was heated to between 90° C. and 100° C. After the solution was maintained at this temperature for about 15 minutes, reagent grade hydrochloric acid was slowly added to the solution to reduce the pH to about 1.3. About 165 ml. of the acid was required for this purpose. Following addition of the acid, the solution was digested for about 3 hours at 90° C. to 100° C. and, after being cooled to substantially room temperature, was filtered. 520 ml. of the sodium salt solution at a specific gravity of about 1.46 was passed through an ion exchange column containing 0.075 cubic feet of Illco 211, a strong cation exchange resin, on the hydrogen cycle. This resin consists of essentially of a sulphonated styrene-divinylbenzene polymerizate (8% cross-linkage) and is sold by the Illinois Water Treatment Co., Rockford, Ill. By passage of the solution through the column the sodium content of the solution was reduced from 9.2% to 0.019% by weight, i.e., the solution was essentially free of sodium and contained essentially free tungstosilicic acid in solution.

The effluent from the cation exchange column was passed immediately through a column of weakly basic anion exchange resin, Dowex-3. The resulting heteropoly acid solution was analyzed and was found to contain only 0.001% by weight of chloride ion. Crystals were obtained by evaporating the solution to about 25 ml. on a steam bath and then cooling. The crystals dissolved completely in water to form clear solutions. They were identified by X-ray diffraction as substantially pure 12-tungstosilicic acid.

*Example III*

An aqueous solution containing 86 grams of ferric nitrate, $Fe(NO_3)_3 \cdot 9H_2O$ and 562 grams of sodium tungstate, $Na_2WO_4 \cdot 2H_2O$ in 3000 ml. of water was acidified with 200 ml. of reagent grade HCl. Insoluble material was filtered from the solution and the solution was then passed through a column containing a strong cation exchange resin, Illco 211, to remove sodium ion, and then through a column filled with Dowex-3 anion exchange resin to remove chloride ion. The effluent from the second column was evaporated at room temperature to produce a solid product which showed X-ray diffraction pattern identifying it as tungstoferric acid. The material dissolved in water to form clear aqueous solutions at concentrations greater than 10% solids.

In the above examples, the solutions were brought in contact with the ion exchange resins by passage of the solutions through columns packed with the resins. It is to be understood that other procedures for contacting the solutions and resins may be used, such as, for example, suspending the resins in the solutions and thereafter filtering the resins from the solutions. In other respects as well, the method of the invention is subject to modification without departing from the true spirit and scope of the invention.

What is claimed is:

1. In the method of preparing a heteropolytungstic acid which comprises preparing an aqueous solution containing a first compound having a tungstate radical and a second compound having a heteroatom, acidifying said solution with a mineral acid to cause reaction between said first and second compounds and formation of a heteropolytungstate, and contacting the solution with a cation exchange resin to remove from the solution the cations present in the solution, the improvement comprising passing the solution, after said contact with a cation exchange resin, in contact with a weakly basic anion exchange resin to remove the anions, including anions of said mineral acid, from the solution and thereafter crystallizing and recovering from the solution the desired heteropolytungstic acid.

2. In the method of preparing a heteropolytungstic acid which comprises preparing an aqueous solution containing a tungstate salt and a salt of a heteroatom, acidifying the solution with hydrochloric acid to cause the formation of a heteropolytungstate radical in the solution, and passing the solution in contact with a cation exchange resin to remove cations originally associated with said salts, the improvement comprising passing the solution, after said contact with a cation exchange resin, in contact with a weakly basic anion exchange resin to remove from the solution anionic radicals, including chloride ion, and finally crystallizing heteropolytungstic acid from the solution.

3. In a method of preparing tungstosilicic acid which comprises preparing an aqueous solution of sodium tungstate and sodium silicate, heating the solution to between 90° C. and 100° C. and slowly adding sufficient hydrochloric acid thereto to reduce the pH of the solution to about 1.3, continuing heating the solution to cause formation of the tungstosilicate radicals therein, cooling the solution substantially to room temperature, and passing the solution in contact with a cation exchange resin to remove sodium ions from the solution, the improvement comprising passing the solution, after said contact with a cation exchange resin, in contact with a weakly basic anion exchange resin to remove chloride ion therefrom and finally crystallizing tungstosilicic acid from the solution.

4. In a method of preparing tungstoferric acid which comprises dissolving ferric nitrate and sodium tungstate in water, acidifying the resulting solution with hydrochloric acid, and passing the solution in contact with a cation exchange resin to remove sodium ions from the solution, the improvement comprising passing the solution, after said contact with a cation exchange resin, through an anion exchange resin to remove the anions therefrom, including chloride ions, and finally, crystallizing tungstoferric acid from the solution.

References Cited

UNITED STATES PATENTS

| | | | |
|---|---|---|---|
| 2,467,523 | 4/1949 | Dudley | 210—24 X |
| 2,503,991 | 4/1950 | Bechtold | 23—140 |
| 2,744,928 | 5/1956 | Smith et al. | 23—140 X |
| 3,074,820 | 1/1963 | Kunin | 210—24 X |
| 3,156,644 | 11/1964 | Kunin | 23—50 |
| 3,288,562 | 11/1966 | Laferty | 23—140 |

OTHER REFERENCES

Liberti: "Annali DiChimica (Rome)," vol. 43, November 1953, pp. 443–447. Tiger et al.: "Industrial and Engineering Chemistry," vol. 35, February 1943, pp. 186–192.

MILTON WEISSMAN, *Primary Examiner.*

OSCAR R. VERTIZ, *Examiner.*

H. T. CARTER, *Assistant Examiner.*